(12) United States Patent
Duffy et al.

(10) Patent No.: US 11,585,157 B2
(45) Date of Patent: Feb. 21, 2023

(54) EARTH BORING TOOLS WITH ENHANCED HYDRAULICS ADJACENT CUTTING ELEMENTS AND METHODS OF FORMING

(71) Applicant: Baker Hughes Oilfield Operations LLC, Houston, TX (US)

(72) Inventors: Stephen Duffy, Spring, TX (US); Scott Mayer, Magnolia, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 71 days.

(21) Appl. No.: 16/823,131

(22) Filed: Mar. 18, 2020

(65) Prior Publication Data

US 2021/0293093 A1    Sep. 23, 2021

(51) Int. Cl.
*E21B 10/16*    (2006.01)
(52) U.S. Cl.
CPC ................... *E21B 10/16* (2013.01)
(58) Field of Classification Search
CPC ........ E21B 10/42; E21B 10/62; E21B 10/627; E21B 10/633; E21B 10/43; E21B 10/55; E21B 10/56; E21B 10/567
See application file for complete search history.

(56) References Cited

U.S. PATENT DOCUMENTS

| | | | |
|---|---|---|---|
| 4,558,753 A * | 12/1985 | Barr | E21B 10/567 175/431 |
| 4,984,643 A | 1/1991 | Isbell et al. | |
| 5,558,170 A | 9/1996 | Thigpen et al. | |
| 5,992,549 A * | 11/1999 | Fuller | E21B 10/5671 175/431 |

(Continued)

FOREIGN PATENT DOCUMENTS

| EP | 0643194 A2 | 3/1995 |
|---|---|---|
| EP | 0731250 A2 | 9/1996 |
| WO | 2015/072980 A1 | 5/2015 |

OTHER PUBLICATIONS

Sanjit Roy, The Effect of Electro-Osmosis on the Indentation of Clays, Jul. 10, 1991, 6.

(Continued)

*Primary Examiner* — Cathleen R Hutchins
(74) *Attorney, Agent, or Firm* — TraskBritt

(57) ABSTRACT

A tool for drilling a borehole through a formation. The tool comprises a body, blades having rotationally leading surfaces extending from the tool body, cutting elements secured at least partially within cutting element pockets, and linear or rounded transition surfaces between the cutting element pockets and the rotationally leading surface of the blades. The rounded transition surfaces have a radius of curvature between about 3 and 150 millimeters. The disclosure also includes a method of manufacturing an earth-boring downhole tool comprising: providing a tool body and blades comprising a rotationally leading surface extending from the tool body; Forming cutting element pockets into the blades proximate the rotationally leading surface of the blades; Forming linear or rounded transition surfaces between the cutting element pockets and the rotationally leading surface of the blades, the rounded transition surfaces having a radius of curvature between about 3 and 150 millimeters; And securing cutting elements at least partially within the cutting element pockets.

20 Claims, 13 Drawing Sheets

(56) References Cited

U.S. PATENT DOCUMENTS

| | | | |
|---|---|---|---|
| 7,644,786 B2 | 1/2010 | Lockstedt et al. | |
| 7,784,566 B2 | 8/2010 | Gregg | |
| 9,016,406 B2 | 4/2015 | Coleman et al. | |
| 9,488,012 B2 | 11/2016 | Thigpen | |
| 2001/0030063 A1* | 10/2001 | Dykstra | E21B 10/573 175/57 |
| 2005/0241861 A1 | 11/2005 | Cariveau et al. | |
| 2007/0151770 A1 | 7/2007 | Ganz | |
| 2011/0297454 A1* | 12/2011 | Shen | E21B 10/633 175/431 |
| 2015/0292269 A1 | 10/2015 | Rose et al. | |
| 2017/0292330 A1* | 10/2017 | Zhang | E21B 10/55 |
| 2019/0032418 A1 | 1/2019 | Schroder et al. | |
| 2019/0136635 A1 | 5/2019 | Casad et al. | |

OTHER PUBLICATIONS

Smith et al., Hydraulics Optimization Research in Large Diameter Bits Reduces Operator's Variable Costs, https://www.aade.org/application/files/6415/7304/0419/AADE-05-NTCE-58_-_Smith.pdf, (2005), 10 pages.

International Search Report for International Application No. PCT/US21/019473, dated Jun. 14, 2021, 3 pages.

International Written Opinion for International Application No. PCT/US21/19473, dated Jun. 14, 2021, 5 pages.

\* cited by examiner

EARTH BORING TOOLS WITH ENHANCED HYDRAULICS ADJACENT CUTTING ELEMENTS AND METHODS OF FORMING

FIELD

Embodiments of the present disclosure generally relate to earth-boring operations. In particular, embodiments of the present disclosure relate to earth-boring tools enhanced hydraulic performance adjacent cutting elements and methods of forming such earth-boring tools.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using earth-boring tools, such as an earth-boring rotary drill bit. The earth-boring rotary drill bit is rotated and advanced into the subterranean formation. As the earth-boring rotary drill bit rotates, the cutters or abrasive structures thereof cut, crush, shear, and/or abrade away the formation material to form the wellbore.

The earth-boring rotary drill bit is coupled, either directly or indirectly, to an end of what is referred to in the art as a "drill string," which comprises a series of elongated tubular segments connected end-to-end that extends into the wellbore from the surface of earth above the subterranean formations being drilled. Various tools and components, including the drill bit, may be coupled together at the distal end of the drill string at the bottom of the wellbore being drilled. This assembly of tools and components is referred to in the art as a "bottom-hole assembly" (BHA).

The earth-boring rotary drill bit may be rotated within the wellbore by rotating the drill string from the surface of the formation, or the drill bit may be rotated by coupling the drill bit to a downhole motor, which is coupled to the drill string and disposed proximate the bottom of the wellbore. The downhole motor may include, for example, a hydraulic Moineau-type motor having a shaft, to which the earth-boring rotary drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore. The downhole motor may be operated with or without drill string rotation.

Different types of earth-boring rotary drill bits are known in the art, including fixed-cutter bits, rolling-cutter bits, and hybrid bits (which may include, for example, both fixed cutters and rolling cutters). Fixed-cutter bits, as opposed to roller cone bits, have no moving parts. There are generally two types of fixed-cutter bits; matrix bodied bits and steel bodied bits. Matrix bits are typically manufactured with tungsten carbide, which is more erosion resistant than steel. Matrix bits are usually preferred when using high Solid-content drilling mud. Steel bodied bits are usually preferred for soft and nonabrasive formations and large hole size. Steel bodied bits are also better able to withstand impact load than matrix bodied bits.

Steel bit bodies typically include various features including, without limitation, blades, nozzle inserts, and cutting element pockets. Steel bit bodies are typically formed in a machining process by a Computer Numerically Controlled ("CNC") lathe and mill. In this process, a steel bar may be turned to form the general profile of the bit. Orifices and cutting element pockets may be formed by drilling operations. The blades and blade tops may be formed by milling.

FIG. 1 illustrates a prior art fixed-cutter earth-boring rotary prior art drill bit 100 that may be used in conjunction with a drilling system. The prior art drill bit 100 includes a bit body 102 that may further include a plurality of blades 104 that are separated by junk slots 106. Each of the plurality of blades comprise a rotationally leading surface 118, a rotationally trailing surface 122, and a blade face surface 120 between the rotationally leading surface 118 and the rotationally trailing surface 122. The bit body 102 may include internal fluid passageways that extend between the plurality of blades 104 of the bit body 102 and a longitudinal bore, extending through the shank to a drill string. The bit body 102 may further include nozzles 108 in the junk slots 106 that are connected to the internal fluid passageways. In some embodiments, the bit body 102 may include gage wear plugs 110 and wear knots 112. Cutting elements 114, typically poly-crystalline diamond compact (PDC) cutting elements, may be mounted in cutting element pockets 116 that are located proximate to the rotationally leading surface 118 of each of the plurality of blades 104.

Typically, cutting elements 114 are composed of a thin layer of polycrystalline diamond 130 bonded to a cemented tungsten carbide substrate 132 at an interface 128. The thin layer of polycrystalline diamond 130 forms a front cutting face 124 on the cutting elements 114 of the prior art drill bit 100. The thin layer of polycrystalline diamond is typically up to about 3.5 mm thick. These cutting elements 114 are generally cylindrical with a diameter from about 8 mm up to about 24 mm and the peripheral edges of the thin layer of polycrystalline diamond are generally chamfered to increase the cutter's impact resistance. However, cutting elements 114 may be available in other forms such as oval or triangle-shapes and may be larger or smaller than the sizes stated above. Typically, cutting elements 114 are fabricated separately from the bit body and secured within the cutting element pockets formed in the outer surface of the blade. A bonding material such as an adhesive or, more typically, a braze alloy may be used to secure the cutting elements 114 within the cutting element pockets 116. The cutting elements 114 may also be bonded to the cutting element pockets 116 by mechanical affixation.

Cutting elements 114 drill rock formations by shearing, like the cutting action of a lathe, as opposed to roller cone bits that drill by indenting and crushing the rock. The cutting elements' 114 cutting action plays a major role in the amount of energy needed to drill a rock formation. Other factors that impact the amount of energy needed to drill a rock formation include bit stability and bit balling.

FIG. 2 is a view of a face of the prior art fixed-blade earth-boring rotary drill bit 100 illustrating a plurality of blades 104, junk slots 106, nozzles 108, cutting elements 114, and cutting element pockets 116. FIG. 2 illustrates that when the plurality of blades 104 have large blade front curvature, blade material adjacent to the front cutting face 124 of the cutting element 114 may extend beyond the front cutting face 124 of the cutting element 114 creating ledges 126. The ledges 126 adjacent to the front cutting face 124 of the cutting element 114 may create an area where cuttings collect, thus reducing hydraulic flow to the cutting elements 114. The tendency of cutting materials to collect around the blade face surface 120 of the bit body 102 and around the cutting elements 114 is commonly known as "bit balling." Bit balling may damage the cutting element pockets 116 in some applications.

Bit balling is usually caused by hydrated clay minerals or other materials adhering to the cutting elements 114, the blade face surface 120 of the bit body 102, and/or the bottom-hole assembly of a drill string. From an operations standpoint, bit balling is evidenced by increased pump pressures (as the flow pathway through the well bore annulus becomes blocked), reduced rates of penetration, blocked shaker screens, a required over-pull tension that occurs due to a restricted annulus when tripping pipe, and possibly, a stuck pipe.

Once bit balling is diagnosed, conventional methods of remediation are to increase the weight on the bit, add chemicals and perhaps pull the drill pipe out of the hole to clean the bit and the bottom-hole assembly. For a water-based mud, a detergent may be added to the drilling mud to reduce the ability of the hydrated clay to stick to the bit and bottom-hole assembly. Glycol may also be added at about 3% to 4% of system volume, but this often fails to cure the problem.

Preventative measures to minimize bit balling include using a KCl/polymer or CaCl/polymer mud to inhibit the swelling of clays. This is shown, for example, in U.S. Pat. No. 4,984,643 issued to Isbell et al. Another way to address the problem of bit balling is to direct the nozzle discharge to optimize bottom-hole cleaning in a "mud pick" configuration. This is reported, for example, in Smith et al., "Hydraulics Optimization Research in Large Diameter Bits Reduces Operator's Variable Costs," AASDE-05-NTCE-58 (2005). It has also been reported that maintaining a negative potential of a few volts on the drill string assembly may liberate water at the interface between the bit and the hydrated clay. See Sanjit et al., "The effect of electro-osmosis on the indentation of clays," Proceedings of the 32nd US Rock Mechanics Symposium, Norman Okla. (July 1991).

In addition to the above, the design and selection of a bit may also affect bit balling. It is known that fixed cutter bits are more prone to bit balling than are tri-cone bits, and it is further the case that the arrangement of teeth structures on a bit may affect bit balling. FIG. 3, illustrates a detailed view of a rotationally leading surface 118 of one of a plurality of blades 104 in a prior art drill bit 100 having cutting elements 114 secured in cutting element pockets 116. When a bit design has large blade front curvature, blade material adjacent to the cutting elements 114, may extend beyond the front cutting face 124 of the cutting elements 114 creating ledges 126. The ledges 126 may cause cuttings to accumulate, impairing the flow of drilling fluid around the cutting elements 114, thus impairing the ability of the cutting elements 114 and the prior art drill bit 100 to effectively and efficiently engage formation material. Although the art does provide remedial measures, bit balling continues to be a significant factor affecting the costs of drilling new wells.

BRIEF SUMMARY

Accordingly, there exists a need for an improved design for a steel bit body with large blade front curvature that mitigates issues related to bit balling. In addition, a reduction in bit-balling improves flow around the cutting surface of the blade and thus improves the stability and the durability of the blade as well.

Some embodiments of the present disclosure include a downhole earth-boring tool comprising a tool body and at least one blade extending from the tool body. The at least one blade comprises a rotationally leading surface, at least one cutting element pocket, and at least one cutting element at least partially secured within the at least one cutting element pocket. The at least one cutting element pocket is formed into the at least one blade proximate the rotationally leading surface of the at least one blade and defines an interior surface corresponding to a shape of a cutting element. The at least one blade further comprises at least one rounded transition surface between the at least one cutting element pocket and the rotationally leading surface of the at least one blade. The at least one rounded transition surface has a radius of curvature within a range of about 3 millimeters and 150 millimeters.

In additional embodiments, the present disclosure includes a downhole earth-boring tool comprising a tool body and at least one blade extending from the tool body. The at least one blade comprises a rotationally leading surface, at least one cutting element pocket, and at least one cutting element at least partially secured within the at least one cutting element pocket. The at least one cutting element pocket is formed into the at least one blade proximate the rotationally leading surface of the at least one blade and defines an interior surface corresponding to a shape of a cutting element. The at least one blade further comprises at least one linear transition surface between the at least one cutting element pocket and the rotationally leading surface of the at least one blade.

In additional embodiments, the present disclosure includes a method of manufacturing an earth-boring downhole tool comprising: providing a tool body, forming at least one cutting element pocket, forming at least one transition surface between the at least one cutting element pocket and the rotationally leading surface of the at least one blade, and securing at least one cutting element at least partially within the at least one cutting element pocket. Wherein, the at least one cutting element pocket, defines an interior surface corresponding to a shape of a cutting element, and extends into the at least one blade proximate the rotationally leading surface of the at least one blade; and wherein, the at least one transition surface has a radius of curvature within a range of about 3 millimeters and about 150 millimeters.

DETAILED DESCRIPTION

Figure 1:
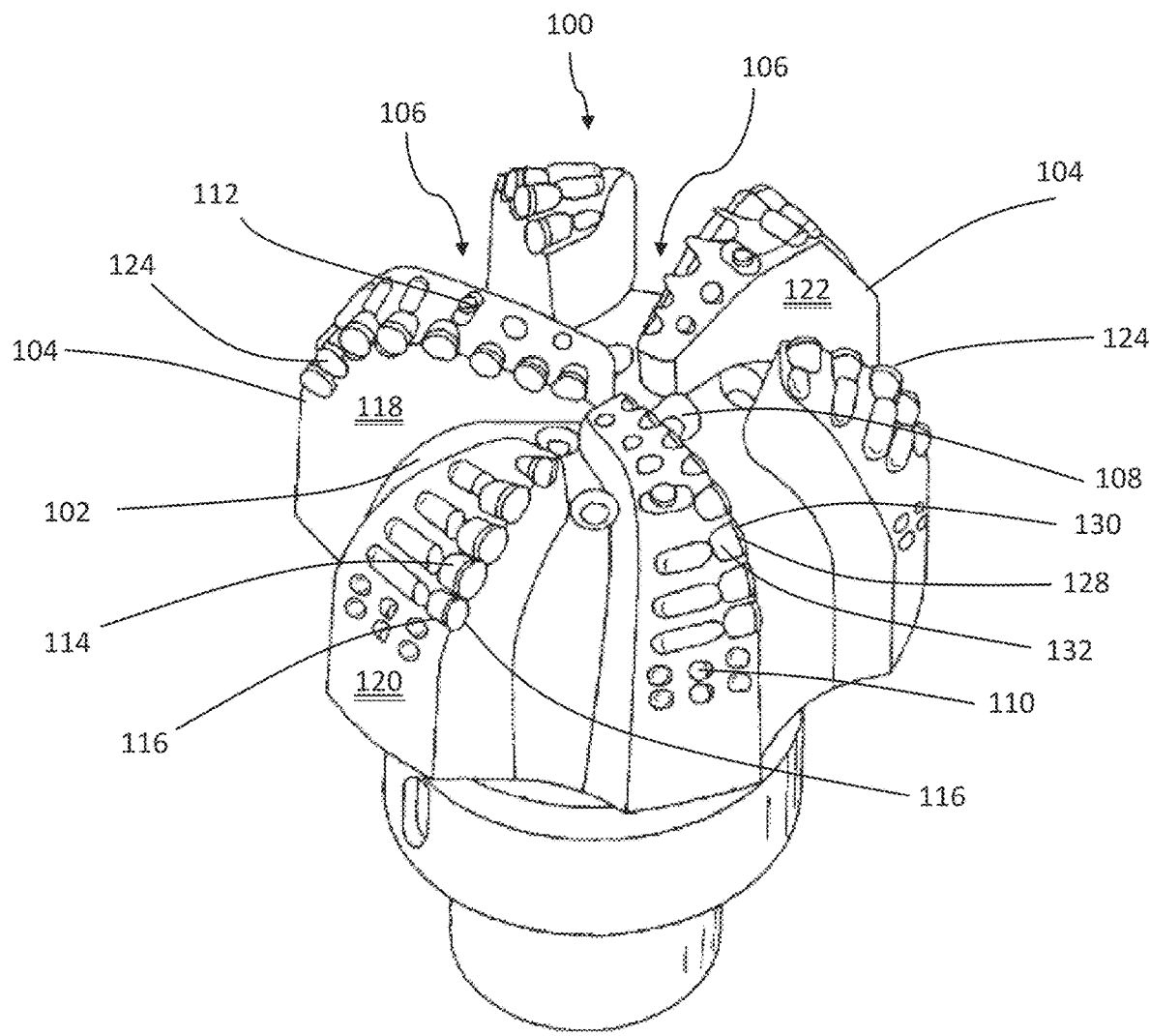
FIG. 1 is a fixed-cutter earth-boring rotary prior art drill bit.
Figure 2:
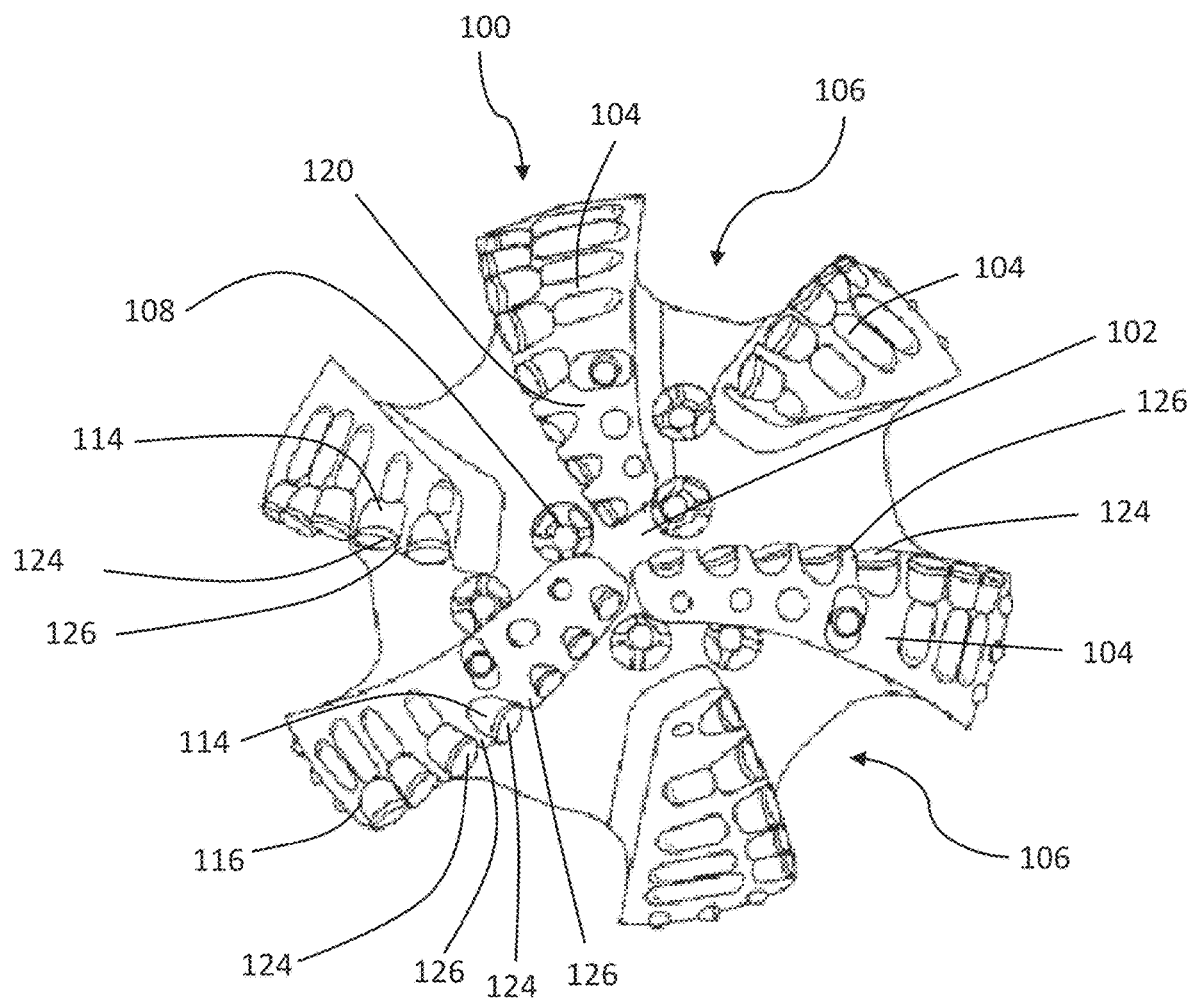
FIG. 2 is a view of a face of the prior art fixed-blade earth-boring rotary drill bit.
Figure 3:
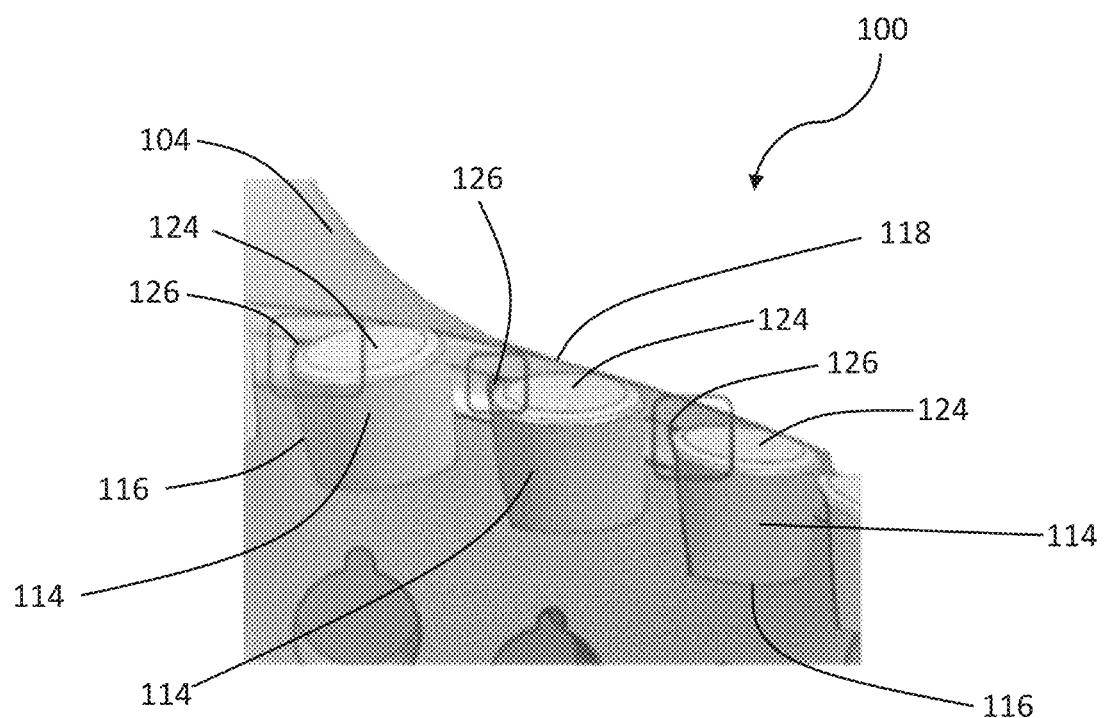
FIG. 3 is detailed view illustrating blade material adjacent to cutting elements extending beyond the front cutting face of the cutting elements on a prior art fixed-blade having large blade front curvature.

The illustrations presented herein are not actual views of any particular cutting assembly, tool, or drill string, but are merely idealized representations employed to describe example embodiments of the present disclosure. The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. The drawings accompanying the application are for illustrative purposes only, and are not drawn to scale. Additionally, elements common between figures may have corresponding numerical designations.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

As used herein, the term "earth-boring tool" means and includes any type of bit or tool used for drilling during the formation or enlargement of a wellbore and includes, for example, rotary drill bits, percussion bits, core bits, eccentric bits, bi-center bits, reamers, mills, drag bits, roller-cone bits, hybrid bits, and other drilling bits and tools known in the art.

Improvements in the flow characteristics of cutting elements along with improvements in the cutting element efficiency and durability of cutting elements may be achieved in accordance with embodiments of the present disclosure. Downhole earth-boring tools, comprising blades having large blade front curvature may have rounded transition surfaces between the blade material and the cutting element pockets. The rounded transition surfaces may provide improved flow characteristics around the cutting element and the bit face, greater blade durability, and improved mechanical efficiency, as described in further detail herein below.

Figure 4:
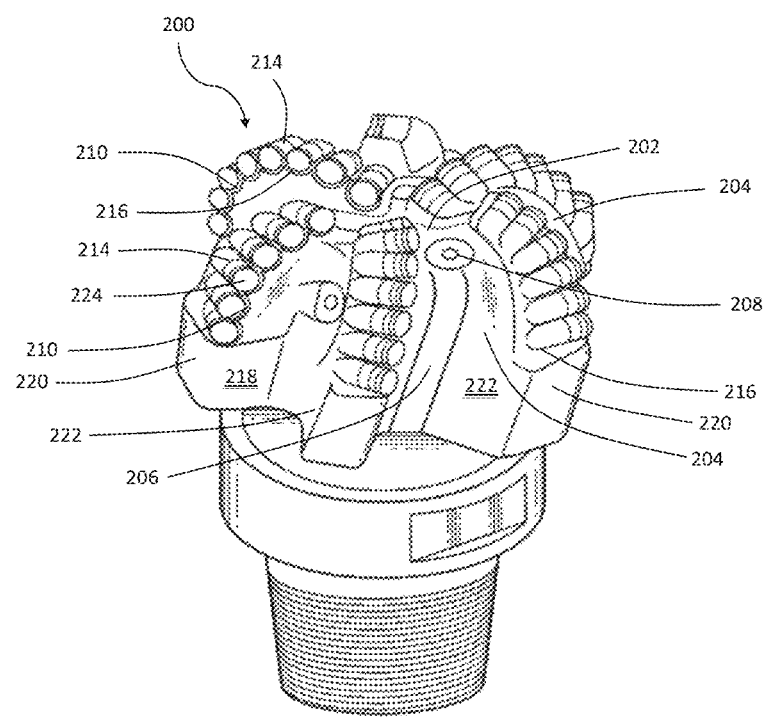
FIG. 4 is a view of a fixed-blade earth-boring rotary drill bit having transition surfaces in accordance with one embodiment.

FIG. 4 is a view of a fixed-blade earth-boring rotary drill bit 200 having transition surfaces 210 in accordance with one embodiment. Drill bit 200 comprises a plurality of blades 204, junk slots 206, nozzles 208, cutting element pockets 216, and cutting elements 214. Each of the plurality of blades comprise a rotationally leading surface 218, a rotationally trailing surface 222, and a blade face surface 220 between the rotationally leading surface 218 and the rotationally trailing surface 222. Cutting element pockets 216 are formed in the blade face surface 220 adjacent the rotationally leading surface 218 of at least one of the plurality of blades 204 and are generally shaped to accept and secure cutting elements 214 to the bit body 202. The positions of the cutting element pockets 216 may be dictated by the desired location of the cutting elements 214 on the finished drill bit 200.

As discussed above, in bit blades having large blade front curvature, a portion of the blade material of bit blades adjacent to a front cutting face 124 of the cutting elements 114 may extend beyond a front cutting face 124 of the cutting elements 114 creating ledges 126 (as illustrated in FIGS. 2, 3, 9A, and 11A). The ledges may create an area where cuttings collect, thus reducing hydraulic flow to the cutting elements 114 which may cause bit balling, bit instability, and may create a possibility of damage to the cutting element pockets 116.

FIG. 4 illustrates transition surfaces 210 formed in the blade material of at least one of the plurality of blades 204 adjacent to at least one of the cutting elements 214 to solve this problem. In some embodiments, transition surfaces 210 may be formed in or cut into the rotationally leading surface 218 and/or the blade face surface 220 of at least one of the plurality of blades 204 proximate to the cutting element pockets 216. The transition surfaces 210 may fully expose the front cutting face 224 of the cutting elements 214 to improve cutting efficiency and effectiveness of the cutting elements 214. In addition, transition surfaces 210 may improve hydraulic flow around the blade face surface 220 of the bit body 202 and the cutting elements 214. Transition surfaces 210 may also reduce the propensity of cuttings to build up around the blade face surface 218 of the bit body 202 and around the front cutting face 224 of the cutting elements 214. Tests have shown a dramatic reduction in the amount of cuttings (bit balling) built up around the blade face surface 220 of the bit body 202 and around the front cutting face 224 of the cutting elements 214 when transition surfaces 210 are formed in the blade face surface 220, proximate to the cutting elements 214.

Figure 5:
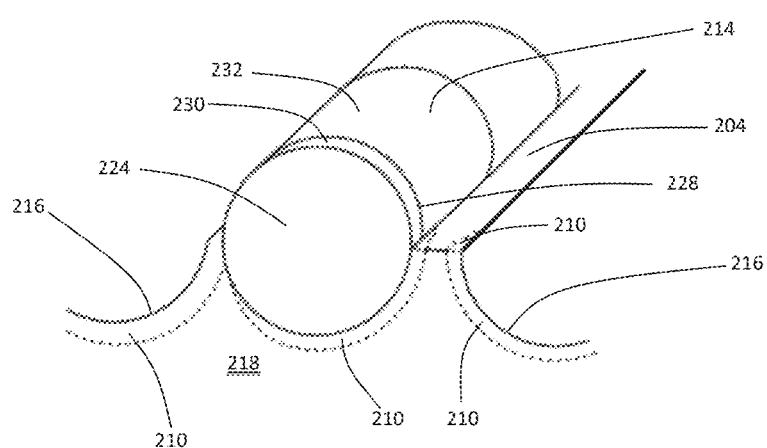
FIG. 5 is a simplified view illustrating transition surfaces adjacent to a cutting element pocket in more detail in accordance with one embodiment.

FIG. 5 is a simplified view illustrating in more detail, transition surfaces 210 adjacent to a cutting element pocket 216 in accordance with one embodiment. Cutting element pockets 216 are formed adjacent a rotationally leading surface 218 on at least one of a plurality of blades 204. Cutting elements 214 may be secured at least partially within the cutting element pockets 216. Cutting elements 214 typically comprise a polycrystalline diamond table 230 bonded to a substrate 232 at an interface 228.

In some embodiments, transition surfaces 210 may be formed in the blade material of at least one of the plurality of blades 204 adjacent to at least one of the cutting elements 214. In some embodiments, the transition surfaces 210 may be formed into the blade material of at least one of the plurality of blades 204 between the cutting element pockets 216 and a rotationally leading surface 218 of the plurality of blades 204. In some embodiments, the transition surfaces 210 may be formed into the blade material of at least one of the plurality of blades 204 between the cutting element pockets 216 and a blade face surface 220 of the plurality of blades 204. In some embodiments, transition surfaces 210 may be formed into the blade material of at least one of the plurality of blades 204 between the cutting element pockets 216 and both the rotationally leading surface 218 and the blade face surface 220 of at least one of a plurality of blades 204 (see FIGS. 10B, 11B, and 12).

In some embodiments, transition surfaces 210 formed in the blade material of at least one of the plurality of blades 204 adjacent to at least one of the cutting elements 214, may substantially surround a portion of the front cutting face 224 of at least one of the cutting elements 214. In some embodiments, transition surfaces 210 may be formed adjacent to one or more of the cutting elements 214. In some embodiments, transition surfaces 210 may be formed adjacent to most or all of the cutting elements 214. In some embodiments, the transition surfaces 210 may be substantially uniform or similar. In some embodiments one or more of the transition surfaces 210 may be non-uniform or dis-similar.

Figure 10A:
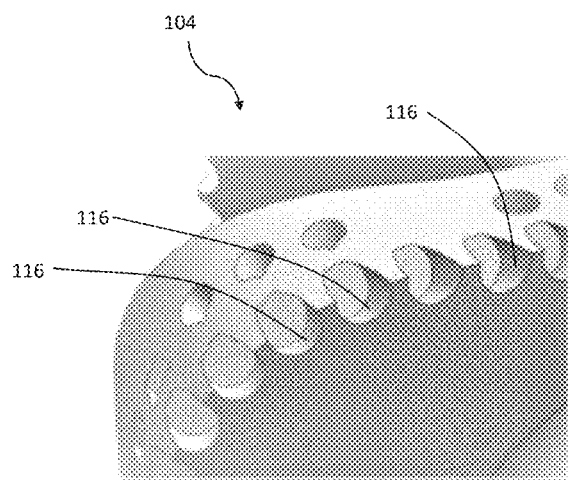
FIG. 10A illustrates a prior art blade and cutting element pockets that do not have transition surfaces adjacent to the cutting element pockets.
Figure 10B:
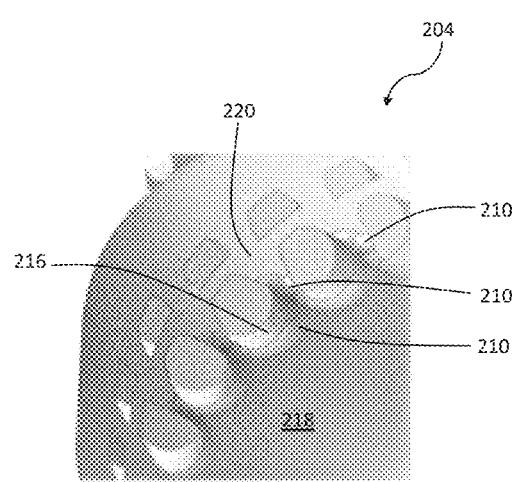
FIG. 10B illustrates an embodiment of a blade that has transition surfaces adjacent to the cutting element pockets.
Figures 11A, 11B:
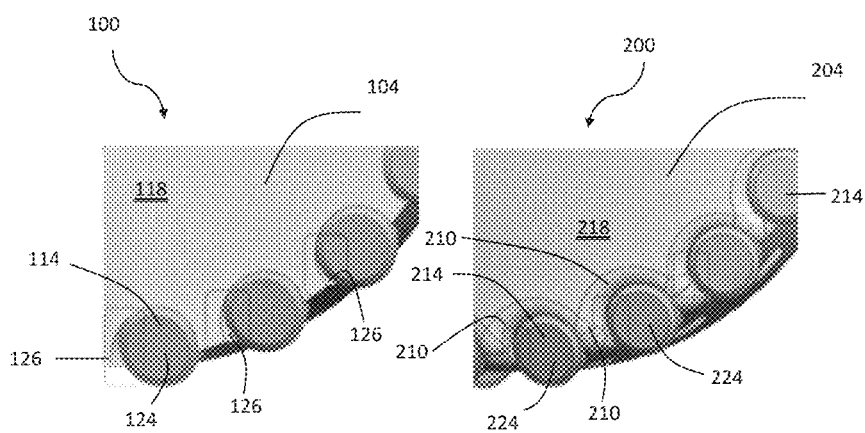
FIG. 11A illustrates a prior art blade that does not have transition surfaces adjacent to the cutting elements.
FIG. 11B illustrates an embodiment of a blade that has transition surfaces adjacent to the cutting elements.
Figure 12:
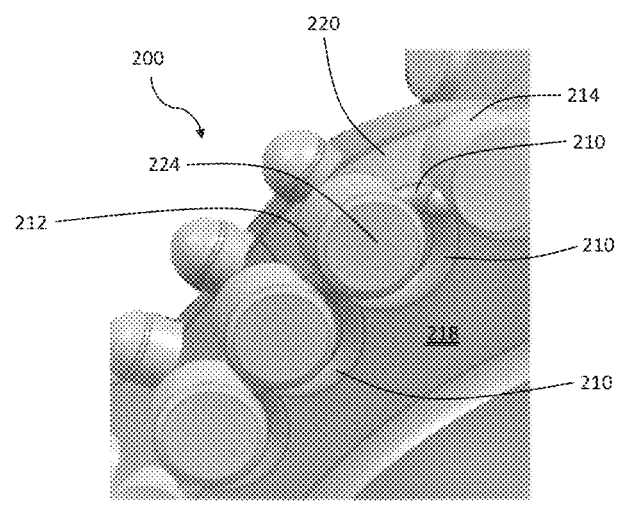
FIG. 12 is a view of transition surfaces disposed partially around cutting elements adjacent to a rotationally leading surface of a blade in accordance with one embodiment.

In some embodiments, depending on the placement of the cutting elements 214, transition surfaces 210 around a first of the cutting elements 214 may merge into transition surfaces 210 around adjoining cutting elements 214 (as illustrated in FIGS. 10B, 11B, and 12). In some embodiments, the transition surfaces may extend away from the cutting element a distance of between 1 millimeter and 100 millimeters. In some embodiments, the transition surfaces 210 may extend into the at least one of a plurality of blades 204 to a depth that may be between 1 millimeter and 50 millimeters.

In some embodiments, the transition surfaces 210 may comprise a substantially concentric or circular surface around the cutting elements 214. In some embodiments, the transition surfaces 210 may comprise a semi-elliptical surface projecting away from the cutting elements 214. In some embodiments the transition surfaces 210 may include an eccentric or non-symmetric surface around the cutting elements 214.

Figure 6:
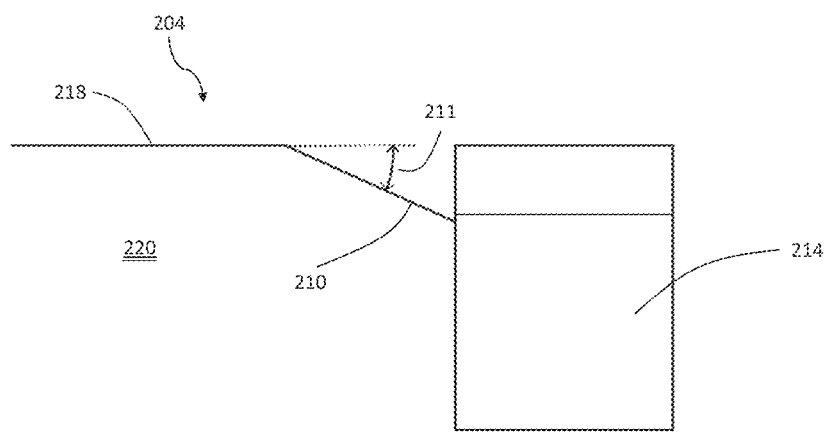
FIG. 6 illustrates a linear transition surface adjacent to a cutting element.

FIG. 6 illustrates an embodiment in which one of the transition surfaces 210 comprises a linear surface between the rotationally leading surface 218 of one of the plurality of blades 204, and the cutting element pockets 216. In some embodiments, the transition surfaces 210 may comprise a linear surface between the blade face surface 220 and the cutting element pockets 216. The angle 211 of the linear surface of the transition surfaces adjacent to the cutting element pockets 216 may be between about 1° to about 60° with respect to the rotationally leading surface 218 or to the blade face surface 220 of at least one of the plurality of blades 204.

Figure 7:
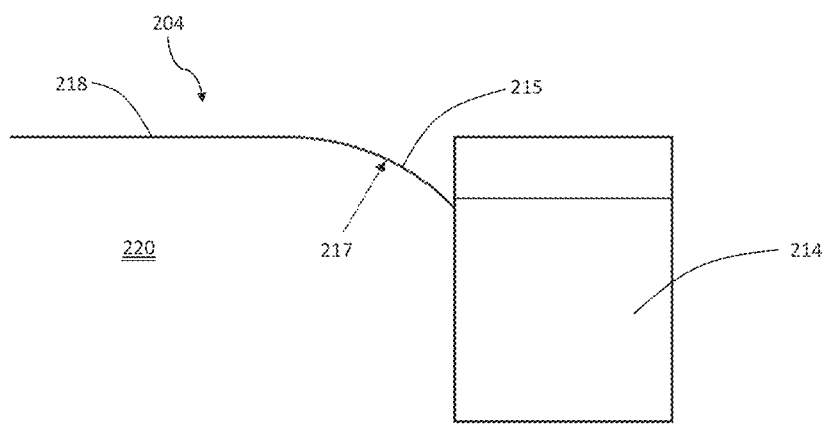
FIG. 7 illustrates a rounded convex transition surface adjacent to a cutting element.
Figure 8:
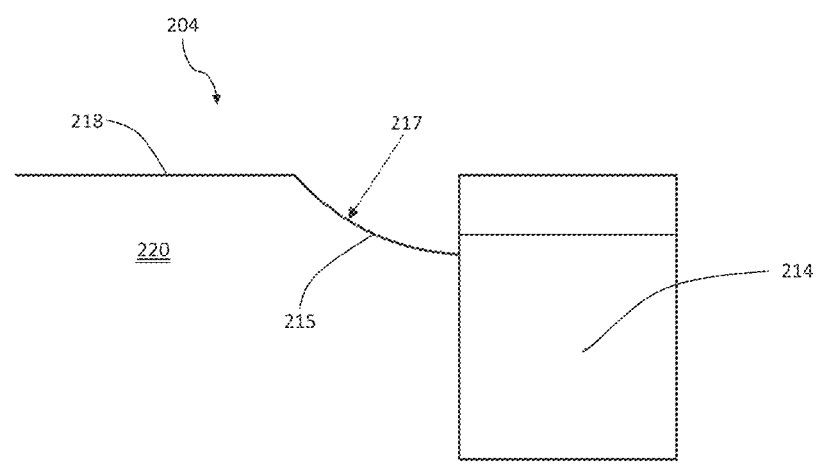
FIG. 8 illustrates a rounded concave transition surface adjacent to a cutting element.

FIGS. 7 and 8 illustrate embodiments in which the transition surfaces 210 define rounded surfaces 215 at the interface between the rotationally leading surface 218 and/or the blade face surface 220 and the cutting element pockets 216 such that there are no right angles at all points between the rotationally leading surface 218 and/or the blade face surface 220 and the cutting element pockets 216. As illustrated in FIG. 7, in some embodiments, the rounded surfaces may be convex. As illustrated in FIG. 8, in some embodiments, the rounded surfaces 215 may be concave. In some embodiments, the rounded surfaces 215 may have a radius of curvature 217 between 1 millimeter and 500 millimeters. In some embodiments, the transition surfaces 210 between the blade face surface 220 and the cutting element pockets 216 may comprise another more complex surface.

In some embodiments, features, such as ribs, ridges, and/or channels may be formed in the blade material of at least one of the plurality of blades 204 adjacent to at least one of the cutting element pockets 216. The features, such as ribs, ridges, and/or channels may improve hydraulic flow around the cutting elements 214. In some embodiments the ribs, ridges, and/or channels may be parallel to each other. In some embodiments, the ribs, ridges, and/or channels may not be parallel. In some embodiments, the ribs, ridges, channels may intersect each other or forma a cross-hatched pattern. In some embodiments, the ribs, ridges, channels may have a uniform width and/or height. In some embodiments, the ribs, ridges, channels may not have a uniform width and/or height. In some embodiments, the ribs, ridges, and/or channels may be wavy.

In some embodiments, ribs, ridges, channels, and/or other features may be formed on at least a portion of surfaces of one or more of the transition surfaces 210. In some embodiments, bumps, dimples (like a golf ball), or other features may be formed in at least a portion of the surfaces of the transition surfaces 210 to improve hydraulic flow around the cutting elements 214. One of skill in the art would recognize that the particular shape, length, depth, and other configurations of the transition surfaces 210 and features within the transition surfaces 210 may depend, for example, on the size of each of the plurality of blades 204, the size and placement of the cutting elements 214, and the intended use of the drill bit.

Figures 9A, 9B:
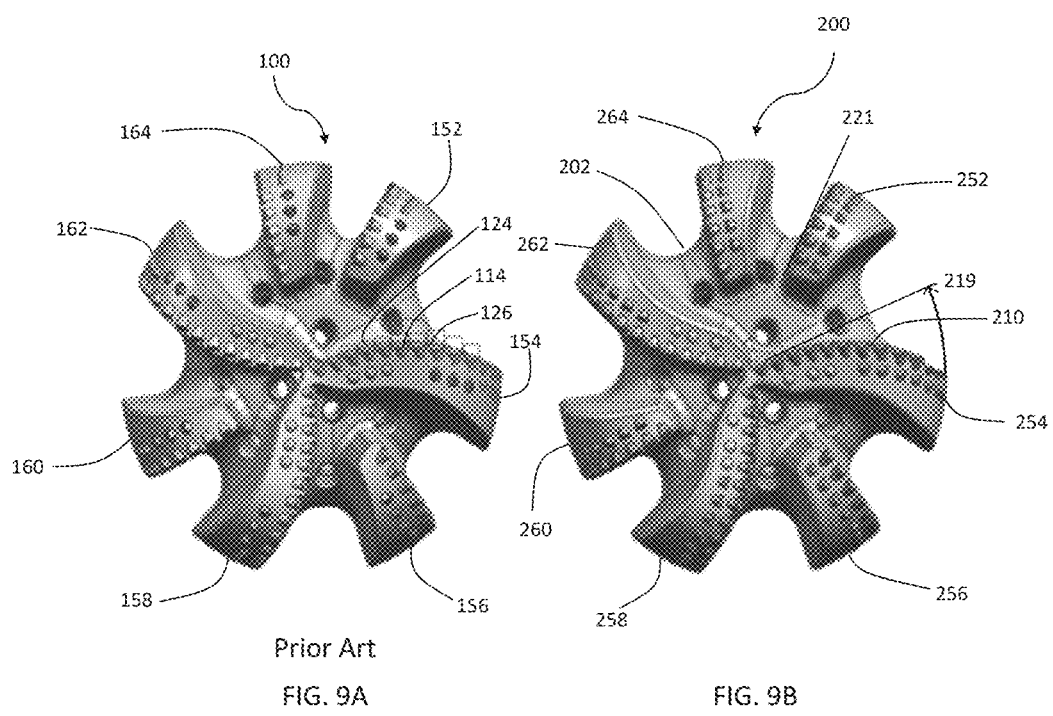
FIG. 9A illustrates a face of a prior art drill bit that does not have transition surfaces adjacent to the cutting elements.
FIG. 9B illustrates a face of a drill bit that has transition surfaces adjacent to the cutting elements in accordance with one embodiment.

FIGS. 9A and 9B may be used to compare a prior art drill bit 100 (FIG. 9A) to one embodiment of a drill bit 200 (FIG. 9B), by illustrating a view of a face of the two drill bits. FIG. 9A illustrates a face of a prior art drill 100 bit that does not have transition surfaces adjacent to the cutting elements 114. FIG. 9A also illustrates a first prior art blade 152, a second prior art blade 154, a third prior art blade 156, a fourth prior art blade 158, a fifth prior art blade 160, a sixth prior art blade 162, and a seventh prior art blade 164. FIG. 9B illustrates a face of a drill bit 200 that has transition surfaces 210 adjacent to the cutting elements 214 in accordance with one embodiment. FIG. 9B, also illustrates a first blade 252, a second blade 254, a third blade 256, a fourth blade 258, a fifth blade 260, a sixth blade 262, and a seventh blade 264.

FIGS. 9A and 9B illustrate that the rotationally leading surfaces of the second, fourth blades 158, 258, and sixth blades 162, 262 have substantial curvature as they extend from the center of the bit body to the outer diameter of the bit body. For example, line 219 illustrates that blade 254 has a curvature of about 30° from the center of the bit body 202 to the outer edge of the bit body 202. In comparison, note that the rotationally leading surfaces of the first, third, fifth, and seventh blades are substantially planar or flat as illustrated by line 221. Prior art FIG. 9A also illustrates blade material (outlined in boxes on the second prior art blade 154) that extends beyond the front cutting face 124 of the cutting elements 114 adjacent to the blade material. Blade material extending beyond the front cutting face 124 of cutting elements 114 is hereinafter referred to as ledges 126.

FIG. 10A illustrates one of the plurality of blades 104 having prior art cutting element pockets 116 without transition surfaces. FIG. 10B illustrates one of the plurality of blades 204 having transition surfaces 210 formed adjacent to cutting element pockets 216 in accordance with one embodiment. FIGS. 10A and 10B compare one of a plurality of prior art blades 104 (FIG. 10A) to an embodiment of one of a plurality of blades 204 (FIG. 10B), by illustrating in more detail cutting element pockets 216 having transition surfaces 210 (FIG. 10B), and prior art cutting element pockets 116 without transition surfaces (FIG. 10A). As illustrated in FIG. 10B, the transition surfaces 210 have been formed by removing material from a rotationally leading surface 218 and blade face surface 220 of at least one of the plurality of blades 204 adjacent to the cutting element pockets 216. Removing material adjacent to cutting element pockets 116 may fully expose the front cutting face 224 of the cutting elements 214 (as illustrated in FIGS. 5, 11B, and 12).

FIG. 10B illustrates an embodiment in which the transition surfaces 210 are substantially concentric and symmetric around each of the cutting element pockets 216. Furthermore, the transition surfaces 210 substantially surround each of the cutting element pockets 216 and merge together between adjacent cutting element pockets 216. In some embodiments, the width of the transition surfaces 210 and the depth of the transition surfaces 210 may be substantially uniform. In some embodiments, the width of the transition surfaces 210 may be substantially equal to the depth of the transition surfaces 210. In some embodiments, the surface of the transition surfaces 210 may be rounded. In some embodiments, the surface of the transition surfaces 210 may comprise a convex surface.

FIGS. 11A and 11B may be used to compare the prior art (FIG. 11A) to one embodiment (FIG. 11B), by illustrating in more detail cutting elements 114 in a rotationally leading surface 118 of one of a plurality of blades 104 without transition surfaces (FIG. 11A); and a rotationally leading surface 218 of one of a plurality of blades 204 according to one embodiment having transition surfaces 210 (FIG. 11B) substantially surrounding cutting elements 214. FIG. 11A illustrates ledges 126 (outlined in boxes) that extend past the front cutting face 124 of cutting elements 114 in one of a plurality of prior art blades 104 with large blade front curvature. The ledges 126 may cause cuttings to accumulate near the ledges 126, impairing the flow of drilling fluid around the cutting elements 114 and the rotationally leading surface 118 of the prior art plurality of blades 104, thus impairing the ability of the cutting elements 114 and the prior art drill bit 100 to effectively and efficiently engage formation material.

FIG. 11B illustrates an embodiment of one of a plurality of blades 204 having transition surfaces 210 adjacent to cutting elements 214. The transition surfaces 210 may expose the entire front cutting face 224 of the cutting elements 214 to formation material; thus, improving the effectiveness of the plurality of blades 204. Transition surfaces 210 may also reduce cuttings from collecting near the cutting elements 214 and may also improve hydraulic flow around the cutting elements 214 and the rotationally leading surface 218 of the plurality of blades 204, thus improving the stability of the drill bit 200.

FIG. 12 illustrates a view of an embodiment of one of a plurality of blades 204 with transition surfaces 210 cut into both the rotationally leading surface 218 and the blade face surface 220 of one of the plurality of blades 204. In this embodiment, the transition surfaces 210 are adjacent to and partially surround the front cutting face 224 of the cutting elements 214. In some embodiments, the transition surfaces 210 may also be cut into the blade face surface 220 of the one of a plurality of blades 204 and may extend along a side surface 212 of the cutting elements 214. In some embodiments, the transition surfaces 210 may be adjacent to the front cutting face 224 of the cutting elements 214. In some embodiments, the surface of the transition surfaces 210 may conform and/or correspond to the shape of the front cutting face 224 of the cutting elements 214. In some embodiments, the transition surfaces 210 may be adjacent to the side surface 212 of the cutting elements 214. In some embodiments, the surface of the transition surfaces 210 may conform and/or correspond to the shape of the side surface 212 of the cutting elements 214. In some embodiments, the transition surfaces 210 may be adjacent to both the front cutting face 224 and the side surface 212 of the cutting elements 214. When transition surfaces are formed adjacent to both the front cutting face 224 and the side surface 212 of the cutting elements 214, the transition surfaces 210 may or may not have the same configuration around the front cutting face 224 as they have around the side surface 212 of the cutting elements 214.

Figure 13:
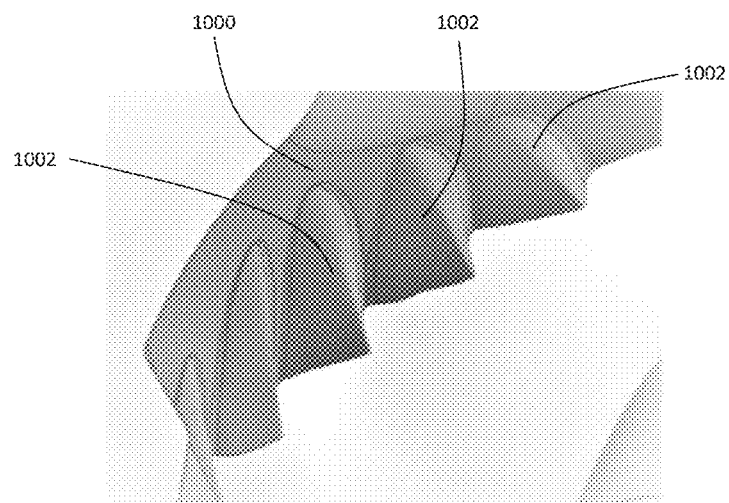
FIG. 13 illustrates an interior surface of a mold for a drill bit body having features that will correspond to transition surfaces around cutting element pockets in the finished drill bit, in accordance with one embodiment.

In accordance with one embodiment, FIG. 13 illustrates features 1002 formed in an interior surface of a mold cavity of a mold 1000 used in the formation of a matrix drill bit 200 (as illustrated in FIG. 4). When powders are placed into the mold 1000 and infiltrated etc., cutting element pockets 216 and associated transition surfaces 210 may be formed in the bit body 202 (as illustrated in FIG. 4). In some embodiments, the features 1002 may be machined into the interior surface of the mold cavity of a mold 1000. In some embodiments, the features 1002, may be formed by milling or by some other process.

In other embodiments, cutting element pockets 216 and transition surfaces 210 (as illustrated in FIG. 4) may be formed by various material removal techniques on an already formed steel bit. The transition surfaces 210 may be formed in a machining process at substantially the same time as the drilling of the cutting element pockets 216. In some embodiments, the transition surfaces 210 may be formed after the cutting element pockets 216 are formed by a milling operation or some other process. In some embodiments, the transition surfaces 210 may be formed by various other processes known in the art including, for example, Electrical Discharge Machining (EDM), wire EDM, a deburr tool, a shot peen, or by grinding.

In addition, in some embodiments, the transition surfaces 210; may have different geometries, may be formed at different times, and may be formed by different processes in the bit manufacturing process. One of ordinary skill in the art would recognize that the form of the transition surfaces, the method of forming the transition surfaces, and the stage of the bit manufacturing process at which the transition surfaces are formed may depend on the particular method used to form the drill bit and the intended us of the drill bit.

In example embodiments, a typical rotary-type "drag" bit made from steel and using cutting elements is described. Those skilled in the art, however, will appreciate that the size, shape, and/or configuration of the bit may vary according to operational design parameters without departing from the scope of the disclosure. Further, embodiments of the disclosure may be implemented on non-rotary drill bits, certain embodiments having applicability to any drilling-related structure including percussion, impact or "hammer" bits. Moreover, although embodiments of the disclosure been described with respect to steel core bits, those skilled in the art will appreciate their applicability to drill bits manufactured from other metals and alloys thereof, and other suitable materials. It will also be appreciated by one of ordinary skill in the art that one or more features of any of the illustrated embodiments may be combined with one or more features from another embodiment to form yet another combination within the scope of the disclosure as described herein. Thus, while certain representative embodiments and details have been shown for purposes of facilitating understanding of the various embodiments, it will be apparent to those skilled in the art that various changes in the embodiments disclosed herein may be made without departing from the scope of the disclosure, which is defined in the appended claims and their legal equivalents.

Additional non-limiting example embodiments of the disclosure are described below.

Embodiment 1: A downhole earth-boring tool comprising a tool body and at least one blade extending from the tool body. The at least one blade comprises a rotationally leading surface, at least one cutting element pocket, and at least one cutting element at least partially secured within the at least one cutting element pocket. The at least one cutting element pocket is formed into the at least one blade proximate the rotationally leading surface of the at least one blade and defines an interior surface corresponding to a shape of a cutting element. The at least one blade further comprises at least one rounded transition surface between the at least one cutting element pocket and the rotationally leading surface of the at least one blade. The at least one rounded transition surface having a radius of curvature within a range of about 3 millimeters and 150 millimeters.

Embodiment 2: The downhole earth-boring tool of Embodiment 1, wherein the rotationally leading surface of the at least one blade adjacent to the at least one cutting element does not extend beyond a front cutting surface of the at least one cutting element.

Embodiment 3: The downhole earth-boring tool of Embodiment 1 or Embodiment 2, wherein the at least one rounded transition surface extends a distance of between 5 and 50 millimeters from the at least one cutting element pocket into the rotationally leading surface of the at least one blade.

Embodiment 4: The downhole earth-boring tool of any of Embodiments 1 through 3, wherein the at least one rounded transition surface extends to a depth of between 2 and 25 millimeters into the rotationally leading surface of the at least one blade.

Embodiment 5: The downhole earth-boring tool of any of Embodiments 1 through 4, wherein there are no right angles in surfaces of the at least one blade between the at least one cutting element pocket and the rotationally leading surface of the at least one blade.

Embodiment 6: The downhole earth-boring tool of any of Embodiments 1 through 5, wherein the at least one rounded transition surface comprises a substantially concentric surface around the at least one cutting element.

Embodiment 7: The downhole earth-boring tool of any of Embodiments 1 through 6, wherein the at least one rounded transition surface comprises a substantially elliptical surface projecting from the at least one cutting element.

Embodiment 8: The downhole earth-boring tool of any of Embodiments 1 through 7, wherein the at least one rounded transition surface comprises a non-symmetric, eccentric surface adjacent the at least one cutting element.

Embodiment 9: downhole earth-boring tool of any of Embodiments 1 through 8, wherein the at least one rounded transition surface defines a convex surface.

Embodiment 10: The downhole earth-boring tool of any of Embodiments 1 through 9, wherein the at least one rounded transition surface defines a concave surface.

Embodiment 11: The downhole earth-boring tool of any of Embodiments 1 through 10, wherein one or more of the at least one blade(s) of the downhole earth-boring tool, have a blade front radius of curvature greater than 15 cm.

Embodiment 12: The downhole earth-boring tool of any of Embodiments 1 through 11, further comprising the at least one rounded transition surface extending adjacent to at least a portion of a side of the at least one cutting element.

Embodiment 13: A downhole earth-boring tool comprising a tool body and at least one blade extending from the tool body. The at least one blade comprises a rotationally leading surface, at least one cutting element pocket, and at least one cutting element at least partially secured within the at least one cutting element pocket. The at least one cutting element pocket is formed into the at least one blade proximate the rotationally leading surface of the at least one blade and defines an interior surface corresponding to a shape of a cutting element. The at least one blade further comprises at least one linear transition surface between the at least one cutting element pocket and the rotationally leading surface of the at least one blade.

Embodiment 14: The downhole earth-boring tool of any of Embodiments 1 through 13, wherein the at least one linear transition surface is at an angle of between 1° and 60° with respect to the rotationally leading surface of at least one of the at least one blade.

Embodiment 15: A method of manufacturing an earth-boring downhole tool comprising: providing a tool body, forming at least one cutting element pocket, forming at least one transition surface between the at least one cutting element pocket and the rotationally leading surface of the at least one blade, and securing at least one cutting element at least partially within the at least one cutting element pocket. Wherein, the at least one cutting element pocket, defines an interior surface corresponding to a shape of a cutting element, and extends into the at least one blade proximate the rotationally leading surface of the at least one blade; and wherein, the at least one transition surface having a radius of curvature within a range of about 3 millimeters and about 150 millimeters.

Embodiment 16: The method of Embodiment 15, further comprising removing any blade material from the rotationally leading surface of the blade adjacent to the at least one cutting element that extends beyond a front cutting surface of the at least one cutting element.

Embodiment 17: The method of Embodiment 15 or Embodiment 16, further comprising forming the tool body, the at least one cutting element pocket, and the at least one transition surface by casting.

Embodiment 18: The method of any of Embodiments 15 through 17, further comprising forming the at least one transition surface by machining.

Embodiment 19: The method of any of Embodiments 15 through 18, wherein the at least one transition surface is formed by machining at substantially a same time as the at least one cutting element pocket.

Embodiment 20: The method of any of Embodiments 15 through 19, further comprising forming the at least one transition surface by Electrical Discharge Machining (EDM).

The embodiments of the disclosure described above and illustrated in the accompanying drawing figures do not limit the scope of the disclosure, since these embodiments are merely examples, while the scope is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A downhole earth-boring tool, comprising:
   a tool body;
   at least one blade extending from the tool body, the at least one blade comprising a rotationally leading surface;
   at least one cutting element pocket defining an interior surface corresponding to a shape of at least one cutting element formed into the at least one blade, the at least one cutting element pocket including a mouth proximate the rotationally leading surface of the at least one blade;
   at least one rounded transition surface defining a transition between the rotationally leading surface and the at least one cutting element pocket, the at least one rounded transition surface extending inwardly from the rotationally leading surface of the at least one blade at a position proximate of a cutting face of the at least one cutting element and extending to the mouth of the at least one cutting element pocket, the at least one rounded transition surface having a radius of curvature within a range of about 3 millimeters and 150 millimeters; and
   the at least one cutting element secured at least partially within the at least one cutting element pocket and having a rotationally leading end extending from the at least one cutting element pocket to define a recess with the at least one rounded transition surface, the at least one cutting element having the cutting face at the rotationally leading end that is at least substantially rotationally aligned with the rotationally leading surface of the at least one blade.

2. The downhole earth-boring tool of claim 1, wherein the rotationally leading surface of the at least one blade adjacent to the at least one cutting element does not extend beyond a front cutting surface of the at least one cutting element.

3. The downhole earth-boring tool of claim 1, wherein the at least one rounded transition surface extends a distance of between 5 and 50 millimeters from the at least one cutting element pocket into the rotationally leading surface of the at least one blade.

4. The downhole earth-boring tool of claim 1, wherein the at least one rounded transition surface extends to a depth of between 2 and 25 millimeters into the rotationally leading surface of the at least one blade.

5. The downhole earth-boring tool of claim 1, wherein there are no right angles in surfaces of the at least one blade between the at least one cutting element pocket and the rotationally leading surface of the at least one blade.

6. The downhole earth-boring tool of claim 1, wherein the at least one rounded transition surface comprises a substantially concentric surface around the at least one cutting element.

7. The downhole earth-boring tool of claim 1, wherein the at least one rounded transition surface comprises a substantially elliptical surface projecting from the at least one cutting element.

8. The downhole earth-boring tool of claim 1, wherein the at least one rounded transition surface comprises a non-symmetric, eccentric surface adjacent the at least one cutting element.

9. The downhole earth-boring tool of claim 1, wherein the at least one rounded transition surface defines a convex surface.

10. The downhole earth-boring tool of claim 1, wherein the at least one rounded transition surface defines a concave surface.

11. The downhole earth-boring tool of claim 1, wherein one or more of the at least one blade(s) of the downhole earth-boring tool, have a blade front radius of curvature greater than 15 cm.

12. The downhole earth-boring tool of claim 1, further comprising the at least one rounded transition surface extending adjacent to at least a portion of a side of the at least one cutting element.

13. A downhole earth-boring tool, comprising:
   a tool body;
   at least one blade extending from the tool body, the at least one blade comprising a rotationally leading surface;
   at least one cutting element pocket defining an interior surface corresponding to a shape of at least one cutting element formed into the at least one blade, the at least one cutting element pocket proximate the rotationally leading surface of the at least one blade;
   at least one linear transition surface defining a transition between the rotationally leading surface and the at least one cutting element pocket, the the at least one linear transition surface extending inwardly from the rotationally leading surface of the at least one blade at a position proximate to a cutting face of the at least one cutting element and extending to a rotationally leading extent of the at least one cutting element pocket; and
   the at least one cutting element secured at least partially within the at least one cutting element pocket and defining, with a rotationally leading end thereof, a recess with the at least one linear transition surface, the at least one cutting element having the cutting face at the rotationally leading end that is at least substantially rotationally aligned with the rotationally leading surface of the at least one blade.

14. The downhole earth-boring tool of claim 13, wherein the at least one linear transition surface is at an angle of between 1° and 60° with respect to the rotationally leading surface of at least one of the at least one blade.

15. A method of manufacturing an earth-boring downhole tool, comprising:
   providing a tool body having at least one blade extending from one end of the tool body; the at least one blade comprising a rotationally leading surface;
   forming at least one cutting element pocket, defining an interior surface corresponding to a shape of at least one cutting element, extending into the at least one blade proximate the rotationally leading surface of the at least one blade;
   forming at least one rounded transition surface defining a transition between the rotationally leading surface and the at least one cutting element pocket, the at least one rounded transition surface extending inwardly from the rotationally leading surface of the at least one blade, extending to a rotationally leading extent of the at least one cutting element pocket, and into material of the at least one blade around at least a portion of a periphery of the at least one cutting element pocket; and
   securing the at least one cutting element at least partially within the at least one cutting element pocket with a rotationally leading end thereof extending from the at least one cutting element pocket to be laterally adjacent at least a portion of a depth of the at least one rounded transition surface and with a cutting face at the rotationally leading end of the at least one cutting element being at least substantially rotationally aligned with the rotationally leading surface of the at least one blade, wherein the at least one rounded transition surface extends inwardly from the rotationally leading surface at a position proximate to the cutting face of the at least one cutting element.

16. The method of claim 15, further comprising removing any blade material from the rotationally leading surface of the blade adjacent to the at least one cutting element that extends beyond a front cutting surface of the at least one cutting element.

17. The method of claim 15, further comprising forming the tool body, the at least one cutting element pocket, and the at least one rounded transition surface by casting.

18. The method of claim 15, further comprising forming the at least one rounded transition surface by machining.

19. The method of claim 18, wherein the at least one transition rounded surface is formed by machining at substantially a same time as the at least one cutting element pocket.

20. The method of claim 15, further comprising forming the at least one transition rounded surface by Electrical Discharge Machining (EDM).

* * * * *